US005117178A

United States Patent [19]

Roth

[11] Patent Number: 5,117,178

[45] Date of Patent: May 26, 1992

[54] FAIL-SAFE LOAD POWER MANAGEMENT SYSTEM

[75] Inventor: Roger R. Roth, Minnetonka, Minn.

[73] Assignee: Honeywell Inc., Minneapolis, Minn.

[21] Appl. No.: 669,164

[22] Filed: Mar. 14, 1991

[51] Int. Cl.[5] .......................... G05F 5/02; G05B 24/02

[52] U.S. Cl. .................................... 323/320; 323/237; 323/299; 315/194; 315/291

[58] Field of Search ............... 323/237, 299, 300, 320; 315/194, 195, 291, 294, 307, DIG. 4, DIG. 7; 307/157, 464, 493, 498

[56] References Cited

U.S. PATENT DOCUMENTS 5,004,972 4/1991 Roth .................................... 323/320
5,028,862 7/1991 Roth ............................... 315/194 X

*Primary Examiner*—Steven L. Stephan
*Assistant Examiner*—Emanuel Todd Voeltz
*Attorney, Agent, or Firm*—Edward L. Schwarz

[57] ABSTRACT

An electric power consuming system such as the lighting in a building has local control units for adjusting the power consumed by a preselected load or loads associated with each local control unit. The control units generate a selectable control voltage which has a first range specifying to the loads that no power should be consumed by the loads with voltage outside the first range specifying by its level the amount of power which the loads should draw. The system also includes energy management apparatus whose output is connected across the output of the control units and which can limit the power individual control units can specify to their loads. The invention comprises an interface circuit which connects the energy management apparatus to the control units and translates control voltages from the energy management apparatus falling within a second voltage range within the first range of the selectable control voltage, to a voltage falling outside the first voltage range. The energy management apparatus is of the type which during common failure modes, provides a control voltage within the second range. In this way, safety is not compromised by reason of malfunctioning energy management apparatus turning off lights in occupied areas.

20 Claims, 3 Drawing Sheets

FAIL-SAFE LOAD POWER MANAGEMENT SYSTEM

In these times of increased energy cost, every type of economic activity has come under scrutiny to determine whether there are ways to accomplish the particular activity with less energy. One particular area where improved energy management results in substantial energy savings is in lighting of interior spaces, particularly those in large commercial, office, and industrial structures.

A particular type of lighting control system employs fluorescent bulbs with special electronic ballasts which allow dimming of the bulbs to produce less light output without reduction in efficiency. In this way the high inherent efficiency of fluorescent lighting can be further increased by dimming the lights when there is no need for full light output, for example when rooms are unoccupied or have substantial natural illumination. The dimming control unit typically used is either one for manual adjustment by an occupant or one which sets light output based on sensed light level within the space.

In a commercial lighting control system of particular interest, each ballast which controls output of individual light fixtures has an internal current source which provides a voltage across its control terminals. A control unit presents an impedance at these control terminals which specifies the level of light to be provided. The current source creates a current flow through the control impedance which creates a voltage across the control terminals which is sensed to determine the illumination level requested. While it is possible to use a simple variable resistance to provide the impedance required, it is preferred to use an active circuit drawing operating power from the ballasts' internal current source, since this allows a number of ballasts to be ganged together for control by a single control unit without changing the control characteristics of the control unit. This is advantageous because users of this system will frequently wish to control a number of ballasts with a single control unit.

Even this system, however, is susceptible of further improvement. In the first place, there is often a need for controlling more than the number of ballasts which the single standard control unit can handle. The subject of my U.S. Pat. No. 5,028,862, filed on Dec. 26, 1989, and entitled Voltage Follower Circuit for Use in Power Level Control Circuits, claims and discloses a voltage follower circuit which allows a single control unit to control many more ballasts than its relatively low current sinking capacity allows to be directed connected to it. U.S. Pat. No. 5,028,862 is hereby incorporated by reference into this application. This voltage follower circuit provides an input to which a control unit may be connected and which simulates the electrical characteristics of the control terminals of a ballast. The voltage follower circuit output terminals may be connected to the input terminals of a large number of ballasts and is capable of simulating the impedance of a control unit for many more ballasts than can a standard control unit. This voltage follower circuit reproduces at its output terminals a voltage nearly identical to the voltage produced at its input terminals by the operation of the control unit. The voltage follower circuit therefore substantially extends the capability of a power control such as that described.

A related circuit is typically packaged with the aforementioned voltage follower circuit to provide the convenience of completely removing power from the loads by a special interpretation by this related circuit of the impedance level selected by the standard control unit. This related circuit uses a part of the input voltage range from the control unit to specify total shutoff of the power to the ballasts, this feature being the subject of my related U.S. Pat. No. 5,004,972, filed Dec. 26, 1989, and titled Integrated Power Level Control On/-Off Function Circuit. U.S. Pat. No. 5,004,972 is hereby incorporated by reference into this application. In the embodiment disclosed in this second application, hereafter the "on/off circuit", the range of the total control voltage which is used to cause complete shutoff of power to the ballasts is from about zero to 0.5 volts, with the remainder of the control voltage range up to about 10 volts specifying the level of illumination. Of course, the selection of the zero to 0.5 volt "off" range is arbitrary, but is consistent with the idea of illumination increasing with control voltage.

In operating larger buildings, microprocessors are frequently used in an overall energy management system (EMS) as an efficient and low cost source for improved lighting control as well as control of other energy-related functions within the enclosed space. Once the use of the various parts of the building as a function of time of day and time of week has been established, the EMS can set light levels as deemed appropriate by the building manager and override local light controls. For example, the microprocessor in the EMS with its internal calendar function can during weekend and evening periods of no scheduled occupancy, dim or even completely shut off lights in facilities like warehouses and factories so as to substantially reduce electricity usage.

When used for such lighting control functions, it is useful for the microprocessor in a particular EMS design to communicate with lighting control circuits built according to the two patents U.S. Pat. Nos. 5,028,862 and 5,004,972 and described above. Circuits built according to the teachings of these applications will b referred to hereafter as load power circuits.

Communication with these load power circuits must be on an analog voltage signal level because of their design. Microprocessors typically have a number of output channels which can be used to provide digitally based signals to a converter which translates the digital content of the output channel to a voltage signal whose level represents this digital content. One possible arrangement is for the converter to comprise a digital to analog converter which translates the digital value provided by the microprocessor to a voltage level. Some microprocessors have built-in analog output channels. It is also possible to program the microprocessor to generate a signal comprising width-modulated pulses which can be converted to a voltage level by a low pass filter, where the average filter output voltage represents the desired control voltage. Any of such various types of digital to analog converters receiving digitally based output from a microprocessor will be generally referred to as an analog output channel (AOC) hereafter. Of course, the output voltage of an AOC can be set to a large number of values within a predetermined range according to the digital value presented to the converter and the circuit characteristics and component values of the converter. The functional relationship between the digital value provided to the converter and the voltage level resulting depends on these converter characteristics and can in general have a wide range of scale factors. However, it is convenient from a conceptual standpoint for the interpretation of the microprocessor AOC output to follow the same general convention that the input to the load power circuit has. That is, the lighting level specified by the EMS increases with increasing EMS output voltage.

However, even if this convention is used, for a number of reasons I have found it not preferable to directly connect the AOC as an input to a load power circuit. One of them involves the unique characteristics of the load power input. The load power circuit input terminals actually provide current flow to the control circuit connected across them, in essence generating a variable voltage due to the current flow through the variable impedance presented by the control circuit. The voltage is then interpreted by the on-off part of the load power circuit to determine whether to remove power from the lights and by the ballasts controlling light level to set the level. Since the typical AOC output stage has relatively low current carrying capacity relative to the level of output current provided by the load power circuit input terminals, the control and load power circuits are electrically incompatible.

A second reason arises from the potential for unreliable EMS operation. An EMS is typically nothing more than a common desktop personal computer, and as such does not have the inherent reliability necessary for the application contemplated here. It may lose operating power or it may have an internal failure. In either case, the output from the AOC will change to some value, typically zero volts. Recall that the load power circuit interprets an input voltage within a preselected range, zero and 0.5 volts in the specific embodiment, as calling for the controlled lighting to be completely shut off irrespective of the local control settings. Thus, the possibility exists if the EMS were directly connected to the load power circuit, that failure of the EMS will provide a voltage input to the load power circuit resulting in the lights being completely shut off. For example, in the specific embodiment provided for the on/off circuit, should the EMS lose operating power, then the output impedance of the AOC may present a very low value to the on/off circuit. This will cause the voltage across the load power circuit input terminals to fall within the 0 to 0.5 volt range and be interpreted as calling for shutting off the lights completely. At the very least this interferes with the usage of the controlled space, and may be potentially hazardous. Accordingly, it is necessary to assure that failure of the EMS unit does not provide a low impedance shunt across the load power circuit input.

BRIEF DESCRIPTION OF THE INVENTION

I have found that these problems can be adequately solved by use of a separate novel interface circuit connected across each load power circuit's input terminals. Each interface circuit receives the output of the EMS and isolates it from its load power circuit. The interface circuit can translate the EMS output voltage range to one compatible with the load power circuit input. The interface circuit also converts voltages created by failure of the EMS to an impedance at the output which generates a load power circuit output impedance specifying full light output.

This interface circuit is for use with apparatus of the type having at least one load power circuit which controls the level of electrical power applied to the load from a power source. Each load power circuit is of the type which sets the level of power applied to the load as a predetermined function of the voltage applied to a control terminal of the load power circuit. Each load power circuit removes power from the load when the voltage at the load power circuit's control terminal is within a first preselected voltage range. The interface circuit may be located physically adjacent the load power circuit and be powered by the same DC power supply which powers the load power circuit. The interface circuit has an output terminal for connection to the load power circuit's control terminal and an input terminal for receiving an energy management control voltage.

The interface circuit has two distinct elements, one of which is a voltage translator means having an input terminal comprising the interface circuit's control terminal and receiving the energy management control voltage thereat and a disable input at which is received a disable signal, and having an output terminal comprising the interface circuit's output terminal. The voltage translator means supplies when the disable signal is absent, a voltage at the interface circuit's output terminal which is a predetermined function of the energy management control voltage and which includes at least a part of the first voltage range. When the disable voltage is present at the disable input, the voltage translator means supplies at its output terminals a predetermined safety voltage which is outside of the first voltage range.

The second of the two elements comprising the interface circuit is a threshold detector receiving the energy management control voltage and providing the disable signal to the voltage translator means disable input responsive to the energy management control voltage falling within a second voltage range outside of the first voltage range. In an actual operational system, this second voltage range is chosen to include the effective voltage generated across the EMS output terminals if the EMS malfunctions due to loss of power for it. In this way the threshold detector provides a disable signal to the voltage translator means which overrides the normal conversion of EMS output voltage to an input voltage to the load power circuit and prevents interpretation of the EMS voltage generated during EMS malfunction as calling for completely removing power from the controlled lights.

Accordingly, the purpose of this invention is to avoid a situation where common types of malfunction of the EMS results in lights or other loads being improperly turned completely off.

DESCRIPTION OF THE PREFERRED EMBODIMENT

Figure 1:
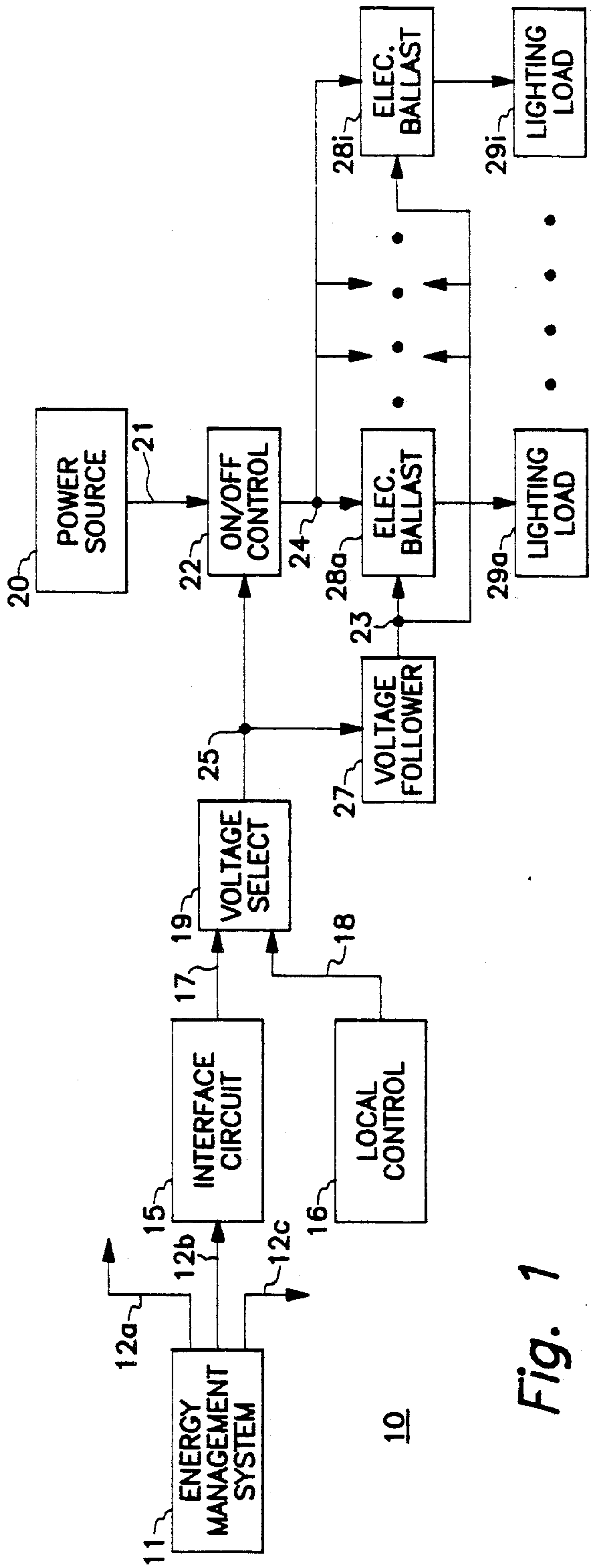
FIG. 1 is a block diagram of a lighting system which employs the interface circuit of the invention.

In understanding the purpose and operation of the invention here, it is helpful to understand a representative system in which it may operate. Such a system may be used for controlling lights as well as other functions within a facility is shown in FIG. 1. Overall operation of the energy-using systems within the facility is controlled by EMS 11 which has a number of output paths 12*a*, 12*b*, and 12*c* each of which is connected to one of these energy-using systems. The energy-using system involving the invention controls lighting levels within the facility as specified by the level of a control voltage provided on path 12*b* by EMS 11. One should understand that there may be a number of different lighting systems all under the control of a single EMS 11. However, all lights on a particular lighting system are under the control of the same control voltage on whatever EMS output path 12*a*, 12*b*, or 12*c* is connected to the lighting system. If it is desired that EMS 11 command different light levels to two different fixtures, it is necessary to have the fixtures in lighting systems to which are connected different EMS output paths 12*a*, 12*b*, or 12*c* each potentially supplying different control voltages from EMS 11.

The interface circuit 15 shown in FIG. 1 is the subject of the invention here. It translates the EMS 11 control voltage on path 12*b* into a format compatible with the voltage supplied by the local control 16 and the voltage select 19. These local controls may be a wall switch under manual control, an occupancy sensor, or a time-based switch. In the design contemplated here, voltage select 19 is a simple analog wired OR element which provides on its output path 25 the lower of the two voltages present on its input lines 17 and 18. In the specific embodiment involved here, voltage on paths 17, 18, and 25 can vary between zero and 10 volts.

The load power circuit alluded to earlier comprises the on/off control circuit 22 and the voltage follower circuit 27. The on/off control circuit 22 switches power received on path 21 from power source 20 to the electronic ballasts 28*a*–*i* via path 24. The ballasts 28*a*–*i* supply electric power to individual lighting loads 29*a*–*i* respectively. This electric power is conditioned by ballasts 28*a*–*i* to control the light output of the loads 29*a*–*i*. When voltage on path 25 is between zero and about 0.5 volts, the on/off control 22 switches the power off to the ballasts 28*a*–*i*. When the voltage on path 25 is above 0.5 volts, power from source 20 is supplied to ballasts 28*a*–*i* through on/off control circuit 22 and paths 21 and 24. Voltage on path 25 is duplicated by the output of voltage follower circuit 27 on path 23 to specify the level of light output desired for the individual loads 29*a*–*i*.

Figure 3:
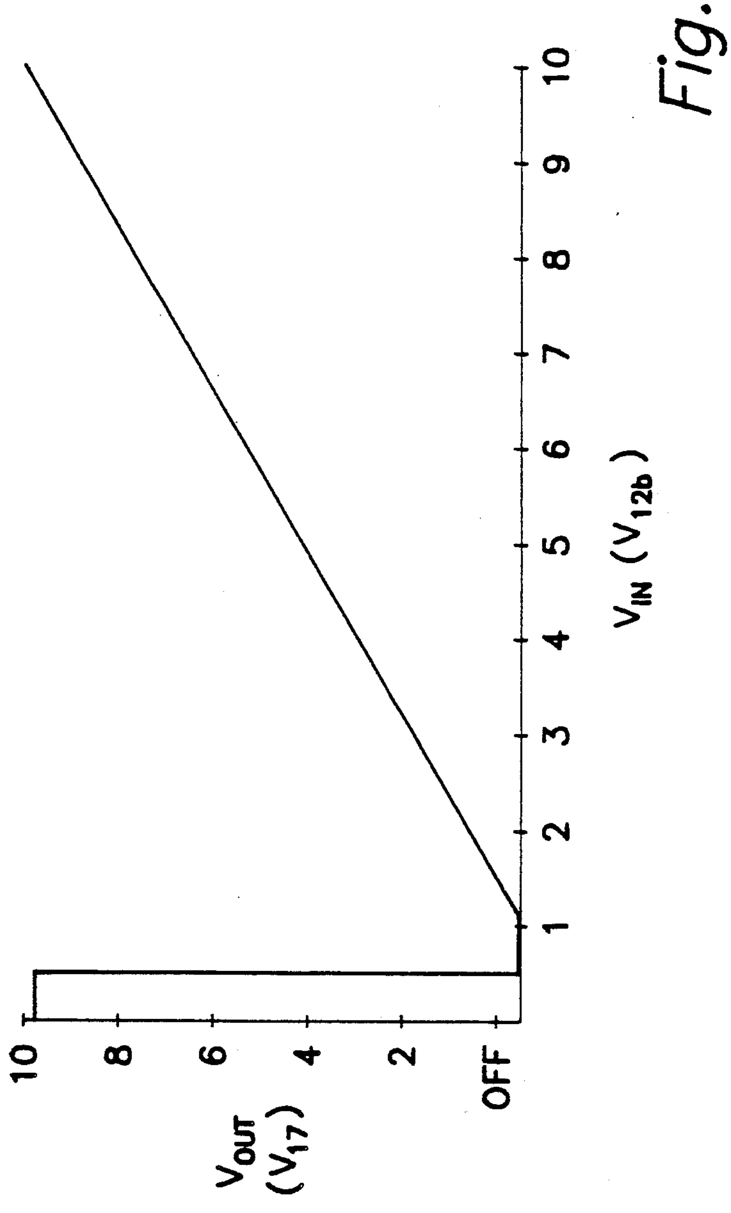
FIG. 3 is a graph which plots the output voltage of the specific circuit embodiment of FIG. 2 as a function of the input voltage to it.

As mentioned, the problem which the interface circuit 15 addresses arises from the potential of malfunction of EMS 11 which may cause the voltage on path 25 to fall within the zero to 0.5 volt range, thereby switching power to ballasts 28*a*–*i* off. Interface circuit 15 senses when EMS 11 voltage on path 12*b* is below 0.5 volt, and in response to this input voltage level, provides a 9.8 volt output on path 17. The output on path 17 of interface circuit 15 in response to the input voltage over the range of zero to 10 volts is shown in the graph of FIG. 3.

Figure 2:
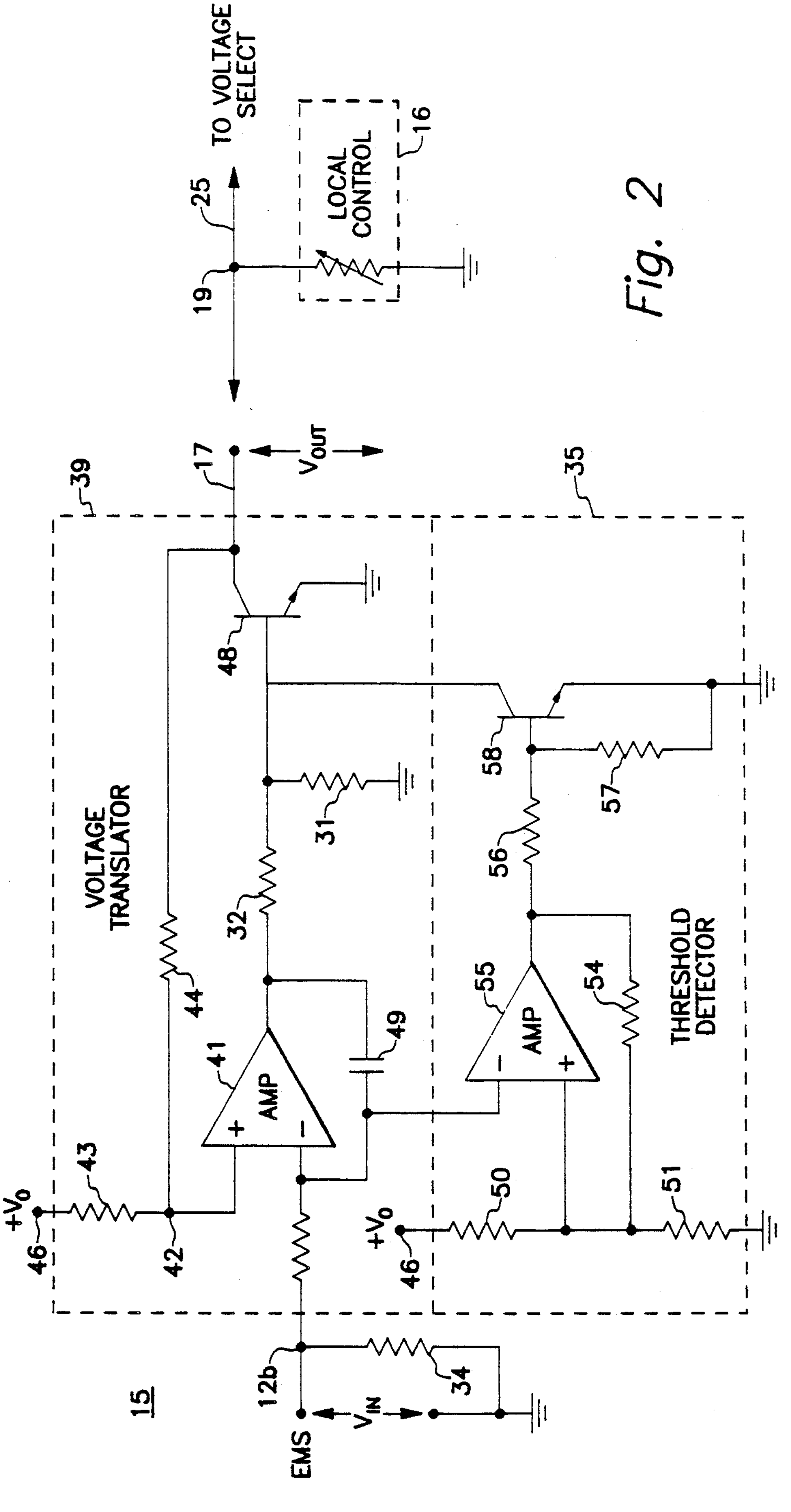
FIG. 2 is a circuit diagram of a specific embodiment for the interface circuit.

The interface circuit 15 shown in detail in FIG. 2 receives the EMS output voltage between path 12*b* and ground and across resistor 34. Resistor 33 connects this voltage to the minus input terminals of a pair of operational amplifiers 41 and 55. The positive input terminal of amplifier 41 is connected by resistor 43 to the supply voltage $V_0$ which in the preferred embodiment is +12 v., and to the output path 17 of the interface circuit 15 through resistor 44. The positive input terminal of amplifier 55 receives a voltage from a voltage divider comprising resistors 50 and 51. In the preferred embodiment, resistors 50 and 51 are selected to provide a voltage at the connection between them of 0.5 volt. The negative input terminals of both amplifiers 41 and 55 are also connected to the output terminal of amplifier 41 through capacitor 49. Capacitor 49 lends stability to the operation of amplifier 41 and prevents oscillation of it during operation.

Amplifier 41 and a semiconductor device such as transistor 48 and their associated circuit elements comprise a voltage translator 39 which under normal conditions provides a voltage on path 17 which follows the voltage on path 12*b* with a scale factor and offset determined by resistors 43 and 44 and supply voltage $V_0$. The output of amplifier 41 is applied to a voltage divider comprising resistors 31 and 32 which connect amplifier 41 output to transistor 48. The values of resistors 31 and 32 should be chosen so as to allow the impedance of transistor 48 to vary from near zero to near infinity as the output voltage of amplifier 41 varies from zero volts to its maximum voltage. The difference between the collector voltage of transistor 48 and the supply voltage $V_0$ is divided by resistors 43 and 44 to form the voltage input to the positive input terminal for amplifier 41. Preferably, resistor 43 is substantially larger than resistor 44 so that the voltage applied to the positive input terminal of amplifier 41 is slightly more positive than the collector voltage of transistor 48, which forms the output voltage on path 17. In a preferred embodiment, the ratio of resistance value for resistor 43 to that of resistor 44 is approximately 10 to 1, so that the voltage applied to the positive input terminal of amplifier 41 is one-tenth of the difference between $V_0$ and the voltage at the collector of transistor 48, plus the voltage at this collector. The total resistance of the divider formed by resistors 43 and 44 should also be substantially lower than the effective impedance provided by local control unit 16 between path 25 and ground when set to provide a relatively high voltage across its terminals and thereby demand increased power flow to the lighting loads 29*a*–*i* of FIG. 1.

Amplifier 41 (and amplifier 55 as well) is of extremely high gain, so that when the voltage on the positive input terminal of amplifier 41 is slightly more positive than the voltage on the negative input terminal, the output voltage supplied to the voltage divider of resistors 31 and 32 rises to its maximum. Transistor 48 performs an inverting function, with its collector voltage dropping when increasing amplifier 41 voltage causes transistor 48 to conduct more heavily. Consequently, the fed back collector voltage of transistor 48 is driven to a level slightly below the voltage at the negative input terminal of amplifier 41. Capacitor 49 stabilizes the performance of this feedback circuit to prevent instabilities such as oscillation by these two active components. It can thus be seen that absent any other input, the voltage on the output terminal 17 of voltage translator 39 generally follows (with a scale factor and offset) the voltage provided at the input terminal 12*b* (point 42) of voltage translator 39. The scale factor arises from the fact that the collector of transistor 48 is always lower than the voltage at the positive input terminal of amplifier 41, by ratio of the resistance of resistor 44 to the resistance of resistors 43 and 44. For example, if the 10:1 ratio for the resistance of resistor 43 to that of resistor 44 exists, then the voltage across resistor 44 will be approximately 1/10th of the voltage across resistor 43. The offset arises from the fact that the collector of transistor 48 cannot be driven below zero volts.

An example may help explain this. Consider the situation where $V_{in}$ is 1 v. If output terminal 17 is momentarily at 1 v., the voltage across resistor 44 is theoretically also 1 v., and the voltage at point 42 is 2 v. With a 1 v. differential across the input terminals of amplifier 41, the output terminal of amplifier 41 would be near 12 v. and transistor 48 would be driven into near total conduction. But then the collector of transistor 48 would drop to near zero volts taking the voltage at point 42 to close to 1 v. This forms a stable situation with the voltage at point 42 only millivolts above the negative input terminal of amplifier 41, and the output of amplifier 41 providing current flow through resistor 32 to the base of transistor 48 sufficient to create impedance across the output terminals of transistor 48 holding point 42 at approximately 1 v. Because of the effect of the voltage divider comprising resistors 43 and 44, this requires the output terminal 17 to be at nearly 0 v. For the 10:1 ratio of resistors 43 and 44, the result is that output terminal 17 becomes greater than 0 v. only when the voltage at input terminal **12*b* becomes greater than about 1.2 v. In FIG. 3, the non-linear portion of the graph between approximately 0.5 and 1.2 v. results from amplifier 41 holding transistor 48 saturated until the voltage at input terminal 12*b* rises to about 1.2 v., at which time the voltage dropped across the resistor 44 is less than the voltage at point 42, allowing the output terminal 17 to follow the voltage at input terminal 12*b*. For the 10:1 ratio for the values of resistors 43 and 44, the output voltage $V_{17}$ at output terminal 17 is zero whenever the voltage $V_{12b}$ at input terminal 12*b*** is below about 1.1 v.. When voltage $V_{12b}$ is higher than 1.2 v., then $V_{17}=1.1\ V_{12b}-1.2$ is the governing equation. One can thus see that output voltage $V_{17}$ is a predetermined function of input voltage $V_{12b}$ and includes all of the off range of zero to 0.5 v.

The range of zero to 0.5 v. for the input terminal **12*b* voltage is detected by the second major element of circuit 15, the threshold detector 35, which then generates a disable signal which is applied to the base of transistor 48 by another semiconductor device shown as transistor 58. Threshold detector 35 receives as its input the circuit 15 input terminal 12*b* voltage applied to the negative input terminal of amplifier 41, and this voltage is also applied to the negative input terminal of amplifier 55. The positive input terminal of amplifier 55 receives a constant voltage from a voltage divider comprising resistors 50 and 51. In my preferred embodiment, the value of resistor 50 is several times the value of resistor 51, so that the voltage applied to the positive input terminal of amplifier 55 is quite close to but appreciably above zero volts. A preferred value for the voltage provided by the divider comprising resistors 50 and 51 is 0.5 volt and the discussion following assumes that this is the nominal voltage created by this voltage divider. Since the characteristics of amplifier 55 are similar to those of amplifier 41, the voltage at the output terminal of amplifier 55** is near its maximum when the voltage at the positive input terminal is greater than the voltage at the negative input terminal and near zero volts when the reverse is true.

The voltage at the output terminal of amplifier 55 is provided through a resistor 54 of relatively large value to the positive input terminal of amplifier 55. The effect of resistor 54 is to provide stability in the output of amplifier 55 when the voltage at the negative input terminal is near the voltage provided by the voltage divider of resistors 50 and 51. If the voltage at the output terminal of amplifier 55 is a high voltage (caused by a relatively low voltage from terminal **12*b* on its negative input terminal) then this high voltage slightly increases the voltage at the positive input terminal of amplifier 55, say by a tenth of a volt or so. If the voltage at the output terminal of amplifier 55 is zero volts arising from a relatively high voltage at terminal 12*b*, then the voltage at the positive input terminal of amplifier 55 is slightly decreased. In effect this creates a zone of hysteresis around the voltage provided by the divider of resistors 50 and 51 within which a voltage at terminal 12*b* cannot change the output terminal voltage of amplifier 55**.

The output voltage of amplifier 55 is applied to yet another voltage divider comprising resistors 56 and 57, which provides a voltage input to the base of transistor 58. The characteristics of amplifier 55, resistors 56 and 57, and transistor 58 are such that when the amplifier 55 output voltage is relatively high (corresponding to a relatively low voltage at terminal **12*b*) transistor 58 conducts heavily, pulling the base of transistor 48 down to near ground and into nonconduction irrespective of the voltage provided by amplifier 41. When transistor 48 is not conducting it cannot influence the voltage on path 25, which then reaches the level created by the impedance string comprising resistors 43 and 44 and the internal impedance of local control unit 16. Thus, when the voltage at terminal 12*b* is below that provided by the resistor 50 and 51 divider, transistor 58 provides a disable signal to the base of transistor 48 overriding the voltage generated at the output of amplifier 41. Absent the effect of local control 16, the voltage at output terminal 17 will be around 9.8 v. as shown in FIG. 3 for $V_{12b}<0.5$ v. If the impedance of local control unit 16 is relatively high, then the voltage on path 25 is also high, and the load power circuit 22, 27 is commanded to provide power to the loads 29*a–i* corresponding to the voltage of local control 16. If the impedance across local control 16 is relatively low, then the voltage on path 25 is also low irrespective of the conductive state of transistor 48, and load power circuit 22, 27 removes power from the loads 29*a–i* in accordance with the voltage across local control 16 as explained in connection with the circuit of U.S. Pat. No. 5,004,972. Thus, if the voltage at terminal 12*b* should be at zero volts or any voltage below approximately 0.5 volt due to malfunction of some sort by the EMS unit 11, a disable signal is provided by transistor 58 to the base of transistor 48 driving transistor 48 out of conduction regardless of the output voltage from amplifier 41. The voltage at output terminal 17 as a function of the voltage at input terminal 12*b* when local control 16 is not influencing the voltage on terminal 17/path 25 is shown in FIG. 3. The hysteresis created by resistor 54 has been ignored in FIG. 3. The voltage at output terminal 17 when the input terminal 12*b*** voltage is below 0.5 v. is a safety voltage in the context of controlling a lighting load, permitting local control of the lights.

A second condition arises when the voltage at terminal **12*b* is between approximately 0.5 and 1.2 v. FIG. 3 shows and the earlier discussion explains that the output voltage on terminal 17 is then zero volts, and rises to above 0.4 v. only when the input voltage reaches about 1.5 v. When the EMS 11 places a voltage on path 12*b* between about 0.5 and 1.5 v., this causes an output voltage which is translated by the interface circuit 15 into a voltage of from 0 to 0.5 v. at the output terminal 17, and which causes the load power circuit 22, 27 to remove power from the loads. Since it is highly unlikely that a malfunctioning EMS 11 will provide a voltage within that range, when the EMS 11** does generate such a 0.5 to 1.5 v. output, the interpretation of it as calling for removing power from the loads is very likely to be correct.

On the other hand, if the voltage at terminal 12*b* is above approximately 1.5 volt, then the voltage at terminal 17 and on path 25 depends on the combined impedances of transistor 48 and the internal impedance of local control unit 16. If the impedance of local control 16 is sufficiently low to pull down the voltage on terminal 17 and path 25 to within the range of zero to 0.5 v., the load power circuit 22, 27 interprets this as a request to remove power from the lighting loads 29*a–i*. When the voltage at terminal 17 and the impedance of local control 16 are both high enough to place the voltage at path 25 above about 0.5 v., then the load power circuit 22, 27 will provide power to loads 29*a–i* at a level specified by the voltage on path 25. In general, when the voltage at input terminal 12*b* is above 1.5 volt, whichever of transistor 48 and local control unit 16 has the lower impedance controls the power supplied to loads 29*a–i* so that the lesser of the two power levels specified occurs. But when the voltage at terminal 12*b* is below 0.5 volt, then the local control unit 16 only sets the power level supplied to loads 29*a–i* since transistor 48 is nonconductive.

It can thus be seen that voltage at terminal 12*b* is divided into a first range of about 0.5 v. to 1.5 volt generally corresponding to the voltage of path 25 specifying that power is to be removed from loads 29*a–i*, and a second range from 0 to 0.5 volt which is translated into a voltage on path 25 which is outside of the first voltage range and where the local control unit 16 only controls the level of power to loads 29*a–i*. In this way, loss of power or other malfunction by the EMS unit 11 which generates a control voltage otherwise specifying that power is to be removed from loads 29*a–i*, does not result in this removal of power.

The reader should realize that both the voltage ranges and circuitry which generates and interprets them need not be precisely as disclosed and explained above, but that there are a large number of conceptual equivalents, all of which I wish to define as my invention by the claims following.

I claim:

1. In apparatus having at least one load power circuit controlling the level of electrical power applied to at least one load from a power source, each load power circuit of the type setting the level of power applied to the load as a predetermined function of the voltage applied to a control terminal of the load power circuit and removing power from the load when the voltage at the load power circuit's control terminal is within a first voltage range, an interface circuit having an output terminal for connection to the load power circuit's control terminal and an input terminal for receiving a variable energy management control voltage, said interface circuit including:

(a) a voltage translator means having an input terminal comprising the interface circuit's input terminal and receiving the energy management control voltage thereat and a disable input at which is received a disable signal, and having an output terminal comprising the interface circuit's output terminal, for supplying when the disable signal is absent, a voltage at the interface circuit's output terminal which is a predetermined function of the energy management control voltage and which includes at least a part of the first voltage range, and for supplying at the interface circuit's output terminal when the disable signal is present at the disable input, a predetermined safety voltage which is outside of the first voltage range; and (b) a threshold detector receiving the energy management control voltage and providing the disable signal to the disable input of the voltage translator means responsive to the energy management control voltage falling within a second voltage range.

2. The interface circuit of claim 1, wherein the voltage translator means comprises (a) an amplifier having a first input terminal serving as the voltage translator means' input terminal and a second input terminal, said first amplifier providing an output signal following an amplified difference of the voltages present on the amplifier's first and second input terminals; and (b) a variable impedance to be connected across a DC power supply, and having an input terminal receiving the amplifier output signal and the disable signal from the threshold detector, and first and second output terminals, the first output terminal comprising the voltage translator means' output terminal, and the second output terminal connected to the second input terminal of the amplifier and providing thereat a voltage following the voltage at the first output terminal of the variable impedance and displaced therefrom, said variable impedance providing at its first output terminal the safety voltage responsive to presence of the disable signal, and a voltage increasing and decreasing with the energy management control voltage otherwise.

3. The interface circuit of claim 2, wherein the variable impedance comprises (a) a series impedance circuit comprising first and second fixed impedances in series connection;

(b) a first semiconductor device having a pair of output terminals across which impedance increases and decreases as the signal level on a control terminal of the first semiconductor device respectively decreases and increases, said first semiconductor device's control terminal receiving the amplifier output and the disable signal, and said first semiconductor device's output terminals in series connection with the series impedance circuit, with the semiconductor device's output terminal connected to the fixed impedance circuit forming the output terminal of the interface circuit; and (c) a conductor connecting the amplifier's second input terminal to the connection between the first and second fixed impedances.

4. The interface circuit of claim 3, wherein the variable impedance is to be attached to the more positive terminal of the DC power supply, and wherein the disable input when present drives the semiconductor device into nonconduction.

5. The interface circuit of claim 4, wherein the threshold detector comprises (a) input stage means receiving as input the energy management control voltage, for providing as an output a first voltage responsive to the energy management control voltage falling within the second voltage range, and a second voltage otherwise; and (b) switch means receiving as input the output of the input stage means and having a first output terminal connected to the control terminal of the first semiconductor device and a second output terminal connected to a source of the disable signal, for connecting the switch means' first and second output terminals to each other responsive to the first voltage output from the input stage means, and disconnecting the switch means' first and second output terminals from each other otherwise.

6. The interface circuit of claim 5, wherein the first semiconductor device is one of the type which is cut off by application of zero volts to its control terminal and wherein the second output terminal of the switch means is connected to a zero volt source.

7. The interface circuit of claim 6, wherein the switch means comprises a second semiconductor device receiving at a control terminal the output of the input stage means, and conducting between its output terminals responsive to the first voltage from the input stage means, and not conducting between its output terminals responsive to the second voltage from the input stage means.

8. The interface circuit of claim 2, wherein the threshold detector comprises (a) input stage means receiving at a first input terminal a fixed voltage equal to the voltage defining an end of the second voltage range and at a second input terminal the energy management control voltage, and providing a first voltage as output when the voltage at the input stage means' first input terminal exceeds the voltage at the input stage means' second input terminal, and a second voltage as output otherwise; and (b) switch means receiving as input the input stage means' output and having a first output terminal connected to the input terminal of the variable impedance and a second output terminal connected to a source of the disable signal, for connecting the switch means' first and second output terminals to each other responsive to the first voltage output from the input stage means, and disconnecting the switch means' first and second output terminals from each other otherwise.

9. The interface circuit of claim 8, wherein the switch means comprises a second semiconductor device whose control terminal receives the input stage means' output voltage and having first and second output terminals corresponding to the first and second output terminals of the switch means, said second semiconductor device connecting its first and second output terminals responsive to the switch means' first voltage output and disconnecting its output terminals responsive to the input stage means' second output voltage.

10. A voltage level shifting circuit having an input terminal to which may be applied a input voltage varying from within to outside of a predetermined voltage range, and an output terminal at which the circuit supplies an output voltage, comprising (a) a voltage translator means having input and output terminals comprising the circuit's input and output terminals respectively, and having a disable terminal at which is received a disable signal, for supplying when the disable signal is absent, a voltage at the output terminal which is a predetermined function of the input voltage, and for supplying at the output terminal when the disable signal is present at the disable terminal, a voltage outside of the voltage range; and (b) a threshold detector receiving the input voltage and providing the disable signal to the disable terminal of the voltage translator means responsive to the input voltage falling within the voltage range.

11. The circuit of claim 10, wherein the voltage translator means includes means for supplying a voltage at the output terminal which increases and decreases with the input voltage when the disable signal is absent from the disable terminal.

12. The circuit of claim 10, wherein the predetermined voltage range is defined by zero volts and a first predetermined voltage and the threshold detector comprises means for providing the disable signal to the disable terminal when the input terminal voltage falls between zero volts and the first predetermined voltage.

13. The circuit of claim 10, wherein the voltage translator means comprises (a) an amplifier having a first input terminal serving as the voltage translator means' input terminal and a second input terminal, said first amplifier providing an output signal following an amplified difference of the voltages present on the amplifier's first and second input terminals; and (b) a variable impedance to be connected across a DC power supply, and having an input terminal receiving the amplifier output signal and the disable signal from the threshold detector, and first and second output terminals, the first output terminal comprising the voltage translator means' output terminal, and the second output terminal connected to the second input terminal of the amplifier and providing thereat a voltage following the voltage at the first output terminal of the variable impedance and displaced therefrom, said variable impedance providing at its first output terminal the voltage outside of the predetermined voltage range responsive to presence of the disable signal, and a voltage increasing and decreasing with the voltage on the circuit's input terminal otherwise.

14. The circuit of claim 13, wherein the variable impedance comprises (a) a series impedance circuit comprising first and second fixed impedances in series connection;

(b) a first semiconductor device having a pair of output terminals across which impedance increases and decreases as the signal level on a control terminal of the first semiconductor device respectively decreases and increases, said first semiconductor device's control terminal receiving the amplifier output and the disable signal, and said first semiconductor device's output terminals in series connection with the series impedance circuit, with the semiconductor device's output terminal connected to the fixed impedance circuit forming the output terminal of the interface circuit; and (c) a conductor connecting the amplifier's second input terminal to the connection between the first and second fixed impedances.

15. The interface circuit of claim 14, wherein the variable impedance is to be attached to the more positive terminal of the DC power supply, and wherein the disable input when present drives the semiconductor device into nonconduction.

16. The circuit of claim 15, wherein the threshold detector comprises (a) input stage means receiving as input the voltage on the circuit's input terminal, for providing as an output a first voltage responsive to the input stage's input terminal voltage falling within the predetermined voltage range, and a second voltage otherwise; and (b) switch means receiving as input the output of the input stage means and having a first output terminal connected to the control terminal of the first semiconductor device and a second output terminal connected to a source of the disable signal, for connecting the switch mean' first and second output terminals to each other responsive to the first voltage output from the input stage means, and disconnecting the switch means' first and second output terminals from each other otherwise.

17. The circuit of claim 16, wherein the first semiconductor device is one of the type which is cut off by application of zero volts to its control terminal and wherein the second output terminal of the switch means is connected to a zero volt source.

18. The circuit of claim 17, wherein the switch means comprises a second semiconductor device receiving at a control terminal the output of the input stage means, and conducting between its output terminals responsive to the first voltage from the input stage means, and not conducting between its output terminals responsive to the second voltage from the input stage means.

19. The circuit of claim 13, wherein the threshold detector comprises (a) input stage means receiving at a first input terminal a fixed voltage equal to the voltage defining an end of the predetermined voltage range and at a second input terminal the circuit's input terminal voltage, and providing a first voltage as output when the voltage at the input stage means' first input terminal exceeds the voltage at the input stage means' second input terminal, and a second voltage as output otherwise; and (b) switch means receiving as input the input stage means' output and having a first output terminal connected to the input terminal of the variable impedance and a second output terminal connected to a source of the disable signal, for connecting the switch means' first and second output terminals to each other responsive to the first voltage output from the input stage means, and disconnecting the switch means' first and second output terminals from each other otherwise.

20. The circuit of claim 19, wherein the switch means comprises a second semiconductor device whose control terminal receives the input stage means' output voltage and having first and second output terminals corresponding to the first and second output terminals of the switch means, said second semiconductor device connecting its first and second output terminals responsive to the switch means' first voltage output and disconnecting its output terminals responsive to the input stage means' second output voltage.

* * * * *